United States Patent [19]

Harmon, Jr.

[11] 4,436,960
[45] Mar. 13, 1984

[54] TELEPHONE RINGING SIGNAL GENERATOR

[75] Inventor: William R. Harmon, Jr., Burlington, N.C.

[73] Assignee: Bell Telephone Laboratories, Incorporated, Murray Hill, N.J.

[21] Appl. No.: 338,224

[22] Filed: Jan. 11, 1982

[51] Int. Cl.³ .............................................. H04M 5/12
[52] U.S. Cl. ............................ 179/51 AA; 179/84 R; 179/18 HB
[58] Field of Search .......... 179/51 AA, 84 R, 18 HB, 179/84 A, 18 F, 18 FA

[56] References Cited
U.S. PATENT DOCUMENTS 4,174,467 11/1979 Ferrieu ........................... 179/18 HB Primary Examiner—Stafford D. Schreyer
Attorney, Agent, or Firm—Gregory C. Ranieri

[57] ABSTRACT

An AC-AC line current reversal technique is employed for generating a telephone ringing signal. Generation of the signal is accomplished by controllably activating one of two series full wave rectification circuits responsive to a transformer coupled AC signal during alternate periods at a rate substantially equal to a desired ringing signal frequency.

8 Claims, 3 Drawing Figures

TELEPHONE RINGING SIGNAL GENERATOR

TECHNICAL FIELD

This invention relates to an AC-AC conversion device for waveform generation and, more particularly, to an electronic ringing signal generator for providing ringing signals in a telephone communication system.

BACKGROUND OF THE INVENTION

Line current reversal is one technique employed in telephone ringing signal generators for converting a transformer coupled alternating current signal into a telephone ringing signal. The transformer coupled alternating current signal is usually a 60 Hz line signal and the ringing signal is a 20 Hz signal, although 30 Hz ringing signals are also in use.

Ringing signal generators of this type incorporate coupling transformers with large iron cores and complex magnetic structures. This is necessitated by the requirement that the transformer accommodate low frequency circulating currents in its magnetic path. The low frequency circulating currents are present at the ringing signal frequency (20 Hz or 30 Hz) and at harmonics of the ringing signal frequency. Presence of these low frequency circulating currents is caused by the lack of suitable isolation between the coupling transformer and the ringing signal generator to inhibit feedback of the ringing signal through the coupling transformer.

SUMMARY OF THE INVENTION

In a ringing signal generator employing an AC-AC line current reversal technique, feedback of the ringing signal to the coupling transformer is substantially eliminated by controllably activating one of two rectification circuits responsive to the input signal for alternate time periods. Each time period has a duration equivalent to one-half of the period for the ringing signal. A first rectification circuit rectifies the input signal as a positive-valued, full wave rectified signal to supply current to a subscriber's line; a second rectification circuit rectifies the input signal as an inverted or negative absolute-valued, full wave rectified signal to supply current to the subscriber's line in an opposite direction. Use of the two rectification circuits ensures that only a 60 Hz line current circulates in the coupling transformer, while a 20 Hz current is delivered to the subscriber's line at the output of the ringing signal generator.

The ringing signal generator is adapted for generating a normal telephone ringing signal, a superimposed DC telephone ringing signal, or waveform adjusted variations of both of the above.

BRIEF DESCRIPTION OF THE DRAWINGS

A more complete understanding of the invention may be obtained by reading the following description of a specific illustrative embodiment of the invention in conjunction with the appended drawings in which.

DETAILED DESCRIPTION

Switched network functions in telephone communications systems are implemented by transmitting control signaling information via alerting signals, address signals and supervisory signals. These signals are usually transmitted over loops or trunks directly involved in an overall connection. However, transmission may also occur over a separate, dedicated signaling channel used as a common signaling facility for many message channels.

Alerting signals are relevant to the present invention because they include, among others, ringing signals. The ringing signal is supplied to a subscriber loop to alert a subscriber that an incoming call is on the line. Incoming calls are usually indicated by alerting in the form of a ringing bell.

Ringing is accomplished by transmitting an AC signal at a nominal frequency of 20 Hz over the subscriber loop from a central office to the subscriber's telephone station. Generation of the ringing signal occurs in apparatus of the type shown in FIG. 1, which is located at the central office. Although the embodiment in FIG. 1 is used in connection with a central office, the ringing generator is equally applicable to private branch exchanges or key telephone systems.

Figure 1:
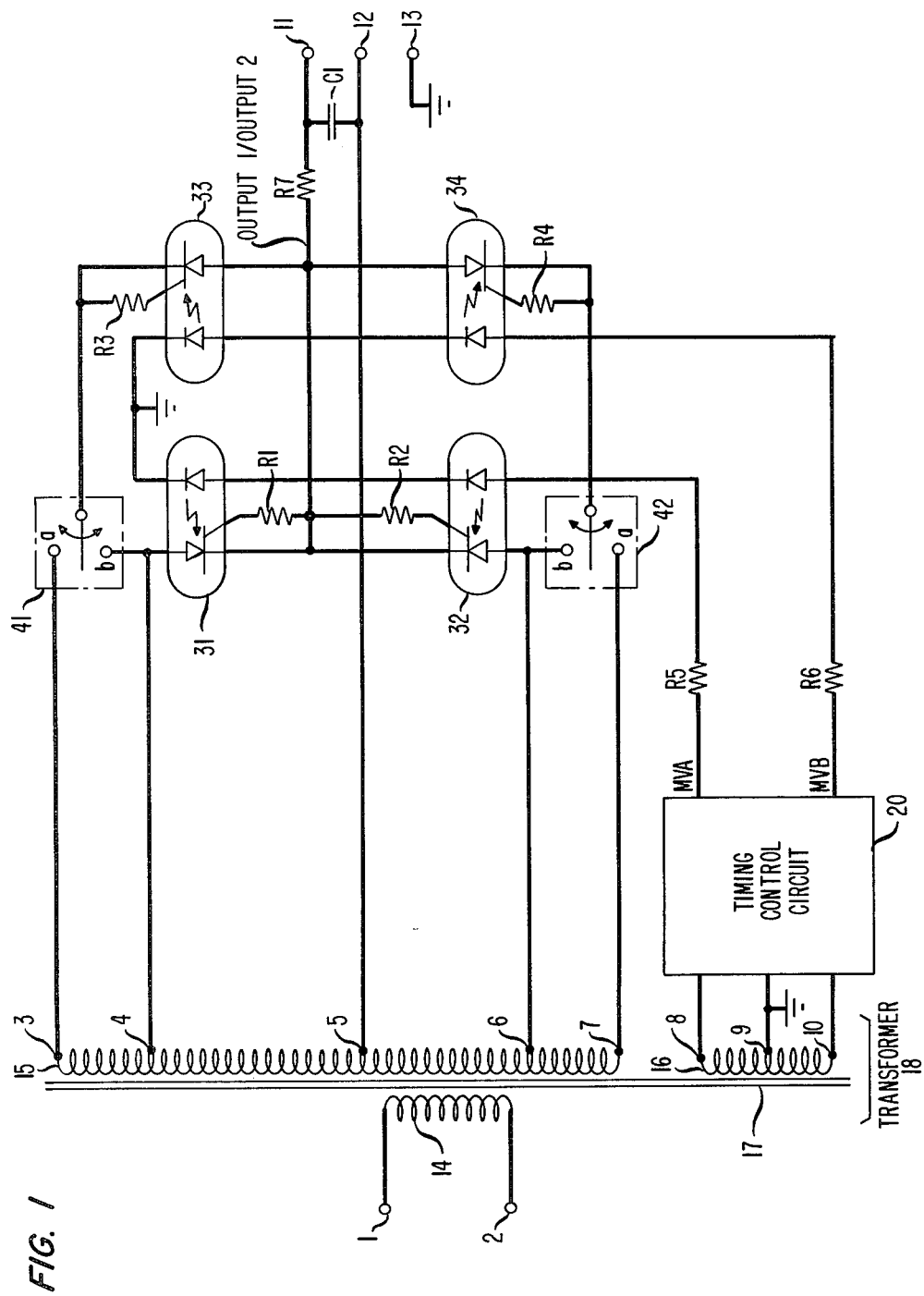
FIG. 1 is a schematic diagram of a telephone ringing signal generator embodying the principles of the invention.

FIG. 1 shows a telephone ringing signal generator adapted for operation in one of two optional modes: a normal ringing mode or a superimposed DC ringing mode. The ringing signal generator includes transformer 18, timing control circuit 20, a diode bridge comprising optoisolators 31 through 34, switches 41 and 42, and an output low pass filter. Optoisolators 31 and 32 form a first rectification circuit; optoisolators 33 and 34 form a second rectification circuit. Switches 41 and 42 select the mode of operation for the ringing signal generator.

An AC signal representing an ordinary line signal of 117 volts at 60 Hz, for example, is input to primary winding 14 of transformer 18 via terminals 1 and 2. This signal is coupled through core 17 to center tapped secondary windings 15 and 16. Secondary winding 15 supplies the transformer coupled signal to both rectification circuits; secondary winding 16 supplies the transformer coupled signal to timing control circuit 20.

Secondary winding 15 includes a plurality of terminals. In FIG. 1, secondary winding 15 is shown having five terminals, namely terminals 3, 4, 5, 6, and 7. Terminal 5 is the center tap of winding 15. Terminals 4 and 6 are placed on opposite sides of the center tap, to produce identical voltage drops of opposite phase with respect to terminal 5. Terminals 3 and 7 are placed outermost and on opposite ends of secondary winding 15. The voltage between terminals 3 and 4 is approximately 50 percent of the voltage developed between terminals 4 and 5. Similarly, the voltage between terminals 6 and 7 is approximately 50 percent of the voltage developed between terminals 5 and 6. For telephone ringing signal applications, exemplary voltages are given as: terminals 3 to 4, 48 volts; terminals 4 to 5, 90 volts; terminals 5 to 6, 90 volts; and terminals 6 to 7, 48 volts.

Secondary winding 16 is a center tapped winding having three terminals, namely, terminals 8, 9 and 10. Terminal 9 is the center tap terminal of winding 16 and is connected to ground. Terminals 8 and 10 are connected to opposite ends of winding 16 on either side of the center tap. The voltages between terminals 8 and 9 and between terminals 10 and 9 are identical. For telephone ringing signal applications, an exemplary voltage drop is 6.3 volts.

Terminals 3 and 4 of winding 15 are connected to switch 41 at terminals a and b, respectively. Terminals 6 and 7 are connected to switch 42 at terminals b and a, respectively. The output of switch 41 is connected to optoisolator 33 and the output of switch 42 is connected to optoisolator 34. Switches 41 and 42 are employed to control the mode of operation of the ringing signal generator by changing the amplitude of the transformer coupled signal as presented to the second rectification circuit. When both switches are positioned across their respective a terminals, the ringing signal is generated in the superimposed DC mode. When both switches are positioned across their respective b terminals, the ringing signal is generated in the normal mode with no DC offset.

Optoisolators 31 through 34 are each comprised of a light emitting diode (LED) having anode and cathode terminals and a light activated silicon controlled rectifier (SCR) having anode, cathode and gate terminals. Integrated circuit optoisolators are widely available. See, for example, photon coupled isolator 4N40.

Gate current in the light activated SCR of each optoisolator is limited by a large resistance connected between the gate and cathode of the SCR. Resistor R1 is connected between the gate and cathode of the SCR in optoisolator 31. Resistor R2 is connected between the gate and cathode of the SCR in optoisolator 32. Resistor R3 is connected between the gate and cathode of the SCR in optoisolator 33. Resistor R4 is connected between the gate and cathode of the SCR in optoisolator 34. Current limiting resistors R1, R2, R3 and R4 have resistances in the range of 10kΩ, for example.

The anodes of optoisolators 31 and 32 are connected to transformers 18 secondary winding at terminals 4 and 6, respectively. The cathodes of optoisolators 31 and 32 are connected together at a first side of resistor R7. Anodes of optoisolators 33 and 34 are connected together also at the first side of resistor R7. Optoisolators 33 and 34 are connected to switches 41 and 42, respectively, in the manner shown in FIG. 1, i.e., SCR cathode to switch pole.

LEDs in the optoisolators are connected in the following manner: the cathodes of the LEDs in optoisolators 31 and 33 are grounded; the cathode of the LED in optoisolator 32 is connected to the anode of the LED in optoisolator 31; the anode of the LED in optoisolator 32 is connected to a first side of current limiting resistor R5; the LED anode in optoisolator 33 is connected to the LED cathode in optoisolator 34; and the LED anode of optoisolator 34 is connected to a first side of current limiting resistor R6. Current limiting resistors R5 and R6 have small resistances, on the order of 22Ω, for example. These resistors are used to couple and current limit signals MVA and MVB from timing control circuit 20 to the respective optoisolators.

Timing control circuit 20 generates control signals MVA and MVB in response to the signal from winding 16 in order to control activation of the optoisolators in the rectification circuits. Signal MVA via a second side of resistor R5 activates optoisolators 31 and 32, the first rectification circuit, while signal MVB via a second side of resistor R6 activates optoisolators 33 and 34, the second rectification circuit.

The generated ringing signal is smoothed either by the subscriber's line or by a first order low pass filter. As shown in FIG. 1, resistor R7 and capacitor C1 form a low pass filter to filter the ringing signal prior to it being output to the subscriber's line at terminals 11 and 12. Capacitor C1 is connected between terminal 5 of secondary winding 15 and the second side of resistor R7. This filter is designed to have a flat response characteristic in the 20-30 Hz frequency range. Filter cutoff frequency is appropriately selected in order to remove out-of-band harmonics generated by the rectification circuits.

After being filtered, the ringing signal is output to the subscriber's line on terminals 11 and 12. Terminal 11 is connected to the second side of resistor R7 and terminal 12 is connected to the center tap of secondary winding 15, terminal 5. Terminal 13 is an output ground terminal. In an alternative embodiment, either terminals 11 and 13 or terminals 12 and 13 are connected together for grounding the ringing signal generator circuit.

Figure 2:
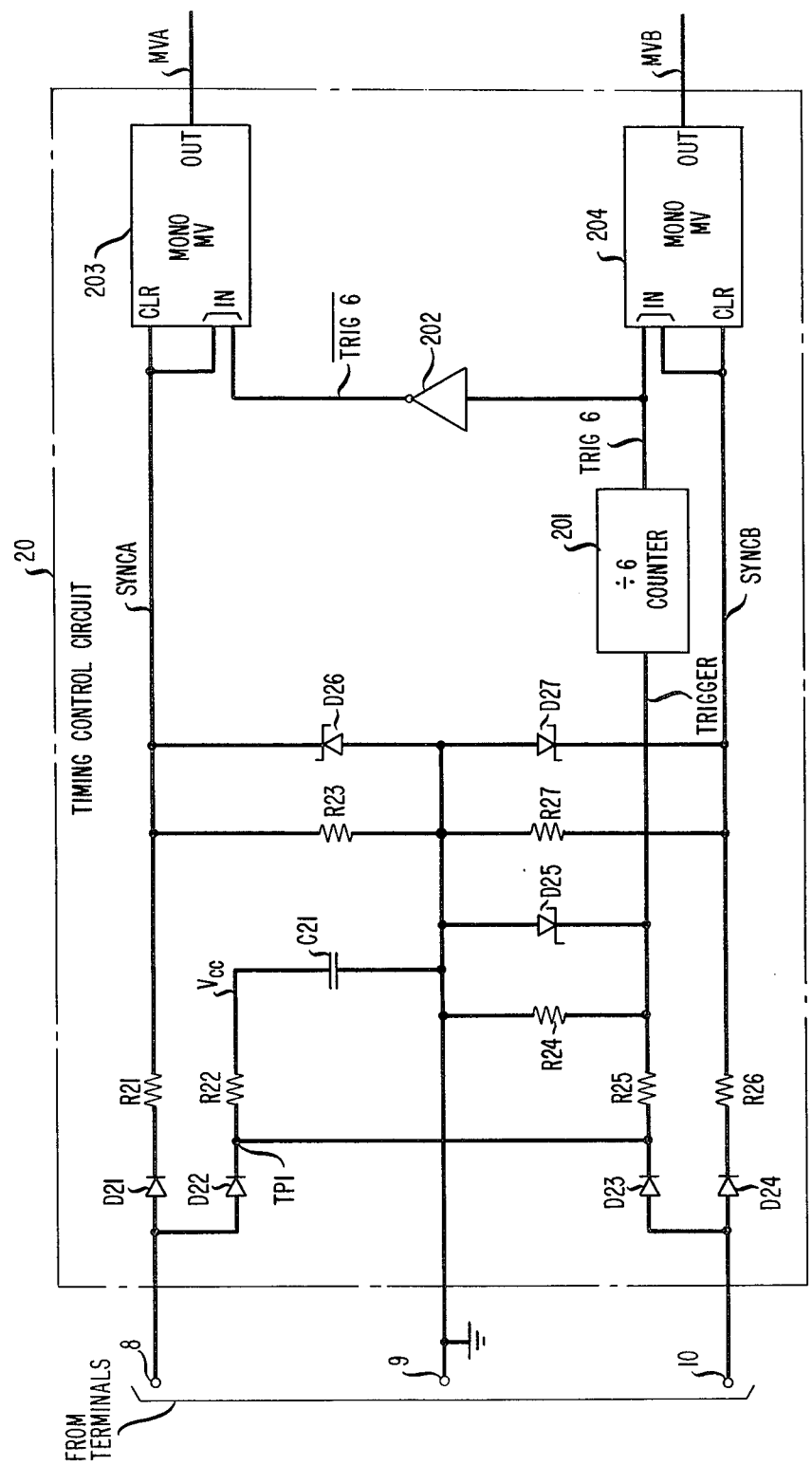
FIG. 2 is a more detailed diagram of timing control circuit 20 shown in FIG. 1.
Figure 3:
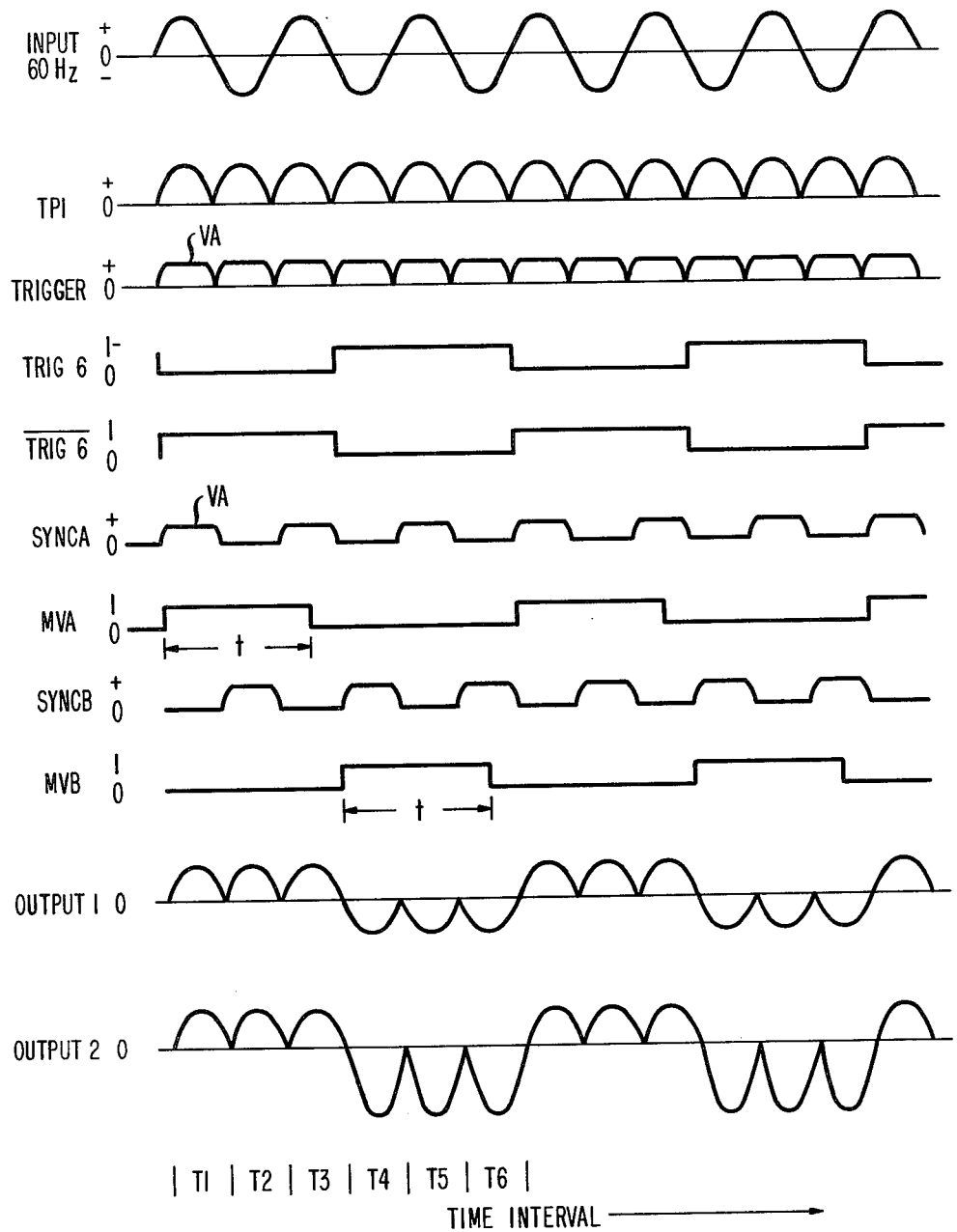
FIG. 3 is a timing diagram showing exemplary signals employed, and generated, by the telephone ringing signal generator of FIG. 1.

FIG. 2 shows a schematic diagram of timing control circuit 20. As stated above, timing control circuit 20 responds to the transformer coupled signal from center tapped secondary winding 16 at terminals 8, 9, and 10 in order to generate control signals MVA and MVB. Timing control circuit 20 includes several different circuits to generate synchronization signals SYNCA and SYNCB, and triggering signal TRIGGER. These signals are shown in FIG. 3.

Synchronization signal SYNCA is generated by a circuit including terminal 8, diode D21, resistors 21 and 23, voltage regulator diode D26 and ground terminal 9. This circuit is characterized as a clipping half wave rectifier for positive cycles of the transformer coupled signal between terminals 8 and 9. Rectification is performed by diode D21 which can be of the type commercially available such as a silicon rectifier 1N5059. Resistors R21 and R23 form a voltage divider wherein resistor R23 has approximately twice the resistance of resistor R21. Exemplary values for these resistors are 120Ω (R21) and 220Ω (R23). Diode D26 clips the signal above a breakdown voltage VA (see FIG. 3). One commercially available diode capable of performing voltage regulation for diode D26 is voltage regulator (Zener) diode 1N746, which has a breakdown voltage VA of 3.3 volts. Thus, signal SYNCA has a maximum amplitude of VA (3.3) volts.

Synchronization signal SYNCB is generated by a circuit including terminal 10, diode D24, resistors R26 and R27, voltage regulator diode D27, and ground terminal 9. This circuit is a clipping half wave rectifier which operates on the negative half cycles of the AC input signal as coupled through transformer 18 between terminals 10 and 9. Rectification is performed by diode D24, which has substantially identical characteristics to diode D21. Resistors R26 and R27 form a voltage divider wherein resistor R27 has approximately twice the resistance of resistor R26. Exemplary values for these resistors are 120Ω (R26) and 220Ω (R27). Diode D27 causes the signal across resistor R27 not to exceed breakdown voltage of VA volts. Diode D27 has substantially identical operating characteristics to diode D26. That is, when diode D27 is replaced by a commercially available diode 1N746, the breakdown voltage VA is 3.3 volts. Thus, signal SYNCB has a maximum amplitude of VA (3.3) volts.

Signals SYNCA and SYNCB, as well as signal TRIGGER, are voltage regulated in order to make them compatible with the type of logic family employed in elements 201, 203 and 204. For the example given above, it is assumed that TTL logic is employed for elements 201, 203 and 204. However, appropriate regulator diodes can be chosen by those of ordinary skill in the art to adapt the signals and breakdown voltage VA to any other logic family such as complementary MOS, for example.

Power supply voltage Vcc and signal TRIGGER are derived by a circuit including terminals 8, 9 and 10, diodes D22 and D23, resistors R22, R24 and R25, capacitor C21, and voltage regulator diode D25. Diodes D22 and D23 are coupled together appropriately to perform full wave rectification of the transformer coupled signal. Signal TP1 (see FIG. 3) represents the output of this rectifier. Resistor R22 and capacitor C21 filter signal TP1 in order to develop a low ripple DC signal suitable for supply voltage Vcc to power the TTL circuits (201, 203, and 204). Signal TP1 is also supplied to a voltage divider comprised of resistors R24 and R25. Diode D25 clips the rectifier voltage dividend signal across R24 at the breakdown voltage VA to generate signal TRIGGER (see FIG. 3).

For an exemplary embodiment of timing control circuit 20, diodes D22 and D23 are identical to diodes D21 and D24. The filter formed by resistor R22 and capacitor C21 exhibits a long time constant of approximately 0.07 seconds, with capacitor C21 at 1000 $\mu$f. Resistors R24 and R25 have substantially equivalent low resistances on the order of 120$\Omega$ and 100$\Omega$, respectively, for example. Diode D25 is identical to the zener diodes employed for diodes D26 or D27.

Counter 201 is a divide-by-six counter. In response to signal TRIGGER, counter 201 generates signal TRIG6 (see FIG. 3) having binary levels. Signal TRIG6 maintains a binary one level for alternate groups of three consecutive positive pulses in signal TRIGGER. During the remaining groups of three consecutive pulses of signal TRIGGER, signal TRIG6 is at a binary zero level. Counter 201 is realized in TTL logic as an integrated circuit 5492/7492, for example.

Inverter 202 complements signal TRIG6 to produce signal $\overline{\text{TRIG6}}$ (see FIG. 3).

Monostable multivibrator 203 generates signal MVA in response to input signals $\overline{\text{TRIG6}}$ and SYNCA. Signal SYNCA is also supplied to the clear input (CLR) of multivibrator 203. Multivibrator 203 also includes a timing resistor and capacitor (not shown) to give a 17 to 25 msec. output pulse duration, t (see FIG. 3), for signal MVA at OUT of multivibrator 203. At the coincidence of positive-going transitions for signals $\overline{\text{TRIG6}}$ and SYNCA, multivibrator 203 generates a binary one level pulse (active level) of duration t seconds for signal MVA. Otherwise, signal MVA is at a binary zero level (inactive level). Exemplary operation of a commercially available monostable multivibrator suitable for performing the functions of multivibrator 203 is shown in well known TTL logic data books with reference to integrated circuit 54123/74123.

Monostable multivibrator 204 is identical, in operational characteristics, to multivibrator 203 described above. Monostable multivibrator 204 generates signal MVB in response to input signals TRIG6 an SYNCB. Signal SYNCB is also supplied to the clear input (CLR) of multivibrator 204. Multivibrator 204 also includes a timing resistor and capacitor (not shown) to give a 17 to 25 msec. output pulse duration, t, for signal MVB. At the coincidence of positive-going transitions for signals TRIG6 and SYNCB, multivibrator 204 generates a binary one level pulse (active level) of duration t seconds for signal MVB. Otherwise, signal MVB is at a binary zero level (inactive level).

FIGS. 1 and 3 are both referred to below in the description of the generation of the telephone ringing signal. Generation of the normal telephone ringing signal, signal OUTPUT1 in FIG. 3, and the superimposed DC telephone ringing signal, signal OUTPUT2 in FIG. 3, is described below for each separate time interval. Each time interval, T1 through T6 as shown in FIG. 3, is equivalent in duration to one half cycle of the input transformer coupled signal denoted INPUT. Over time intervals T1 through T6, the two rectification circuits in the ringing signal generator are controlled by separate signals (MVA and MVB) in order to reverse the direction of current supplied to the subscriber's line at the 20 Hz ringing frequency.

Signal OUTPUT1 is generated by placing switches 41 and 42 in the b position, that is, the switch output terminal is connected to input terminal b. In this description, it is assumed that signal INPUT is a 60 Hz line signal and that signal OUTPUT1 is a 20 Hz ringing signal.

During time intervals T1, T2 and T3, signal MVA activates optoisolators 31 and 32, while signal MVB inhibits or deactivates optoisolators 33 and 34. In time intervals T1 and T3, signal INPUT exhibits positive half-cycles. Current during intervals T1 and T3 flows from secondary winding 15 through terminal 4, optoisolator 31, resistor R7, terminal 11 to a subscriber line (not shown), terminal 12 from the subscriber line, and terminal 5 returning to secondary winding 15.

In time interval T2, signal INPUT undergoes a negative half cycle. Current during this interval flows from secondary winding 15 through terminal 6, optoisolator 32, resistor R7, terminal 11 to the subscriber line, terminal 12 from the subscriber line, and terminal 5 returning to secondary winding 15.

As shown in FIG. 3, signal OUTPUT1 is positive during time intervals T1, T2, and T3. The magnitude of this signal is approximately 90 volts for the exemplary voltages given between the terminals of secondary winding 15.

During time intervals T4, T5 and T6, signal MVB activates optoisolators 33 and 34, while signal MVA inhibits or deactivates optoisolators 31 and 32. In time intervals T4 and T6, signal INPUT exhibits negative half cycles. Current, during intervals T4 and T6, flows from secondary winding 15 through terminal 5, terminal 12 to a subscriber line, terminal 11 from the subscriber line, resistor R7, optoisolator 33, and terminal 4 returning to secondary winding 15.

In time interval T5, signal INPUT undergoes a positive half cycle. Current during interval T5 flows from secondary winding 15 through terminal 5, terminal 12 to the subscriber line, terminal 11 from the subscriber line, resistor R7, optoisolator 34, and terminal 6 returning to secondary winding 15.

As shown in FIG. 3, signal OUTPUT1 is negative during time intervals T4, T5, and T6. The magnitude of this signal is approximately 90 volts for the exemplary voltages between the terminals of secondary winding 15 as recited above.

Signal OUTPUT2 is generated by superimposing a DC voltage, nominally $-24$ volts, on the normal ringing signal. Switches 41 and 42 are placed in the a position, that is, the output terminal of each switch is connected to input terminal a.

During time intervals T1, T2 and T3, optoisolators 31 and 32 are activated to produce signal OUTPUT2 as shown in FIG. 3. Current flows through the identical elements denoted in the description of signal OUTPUT1 generation during these time intervals.

During time intervals T4, T5 and T6, optoisolators 31 and 32 are inactive and optoisolators 33 and 34 are active. Current during intervals T4 and T6 flows from secondary winding 15 through terminal 5, terminal 12 to the subscriber line, terminal 11 from the subscriber line, resistor R7, optoisolator 33, and terminal 3 returning to secondary winding 15. In time interval T5, current flows from secondary winding 15 through terminal 5, terminal 12 to the subscriber line, terminal 11 from the subscriber line, resistor R7, optoisolator 34, and terminal 7 returning to secondary winding 15.

As shown in FIG. 3, signal OUTPUT2 is positive for time intervals T1, T2, and T3 and negative during intervals T4, T5 and T6. The amplitude of signal OUTPUT2 is equal to that of signal OUTPUT1 during time intervals T1, T2 and T3 and is approximately −138 volts during intervals T4, T5 and T6. These amplitudes are based upon the exemplary voltages between the terminals of winding 15 as recited above.

Without departing from the spirit and scope of this invention, it is obvious to those of ordinary skill in the art to modify the circuits of FIGS. 1 and 2 for generating a 30 Hz ringing signal. Waveshaping of the ringing signal is accomplished by combining a low amplitude transformer coupled signal with the ringing signal. The phase difference between the two signals determines the degree of waveshaping which can be achieved. Coupling of the low amplitude signal is accomplished by breaking the connection between terminals 5 and 12 and inserting another small secondary winding on core 17 between terminals 5 and 12.

Additionally, output pulse duration t of multivibrators 203 and 204 varies inversely as a function of the AC input signal frequency and ringing signal frequency. For generation of a 30Hz ringing signal from the 60 Hz AC input signal, the output pulse duration, t, is required to be in the range of 8.4 to 16.6 msec.

What is claimed is:

1. Apparatus for generating a telephone ringing signal comprising a source of an alternating current input signal, control means responsive to the input signal for generating first and second control signals, each control signal having an active level and an inactive level, first means responsive to the first control signal for supplying a current to the subscriber's line during at least a time interval in which the first control signal subsists at an active level, second means responsive to the second control signal for supplying a current to the subscriber's line during at least a time interval in which the second control signal subsists at an active level, the current from the first means being in an opposite direction to the current from the second means, the first control signal having a frequency equal to the frequency of the second control signal, the frequency of the first or second control signal being substantially equal to the frequency of the ringing signal, and the frequency of the ringing signal being substantially less than the frequency of the alternating current input signal.

2. Apparatus for generating a telephone ringing signal comprising a source of an alternating current input signal, control means responsive to the input signal for generating first and second control signals, each control signal having an active level and an inactive level, first series full wave rectification circuit responsive to the first control signal for supplying a current to the subscriber's line during at least a time interval in which the first control signal subsists at an active level, the first rectification circuit having first and second input terminals adapted for receiving the alternating current signal and having a output terminal for connecting the circuit to the subscriber's line, and second series full wave rectification circuit means responsive to the second control signal for supplying a current to the subscriber's line during at least a time interval in which the second control signal subsists at an active level, the second rectification circuit having first and second input terminals adapted for receiving the alternating current signal and having a output terminal for connecting the circuit to the subscriber's line.

3. Apparatus as defined in claim 2 wherein the first series rectification circuit includes a first controllable switching arrangement connected between the first input terminal and the output terminal for providing a circuit path for current to the output terminal during alternate cycles of the input signal, and a second controllable switching arrangement connected between the second input terminal and the output terminal for providing a circuit path for current to the output terminal during other alternate cycles of the input signal.

4. Apparatus as defined in claim 3 wherein the first controllable switching arrangement is identical to and a mirror image of the second controllable switching arrangement about the output terminal of the first series rectification circuit.

5. Apparatus as defined in claim 4 wherein the first and second controllable switching arrangements each include an optical isolator for conducting current to the subscriber's line.

6. Apparatus as defined in claim 3 wherein the second series rectification circuit includes a third controllable switching arrangement connected between the first input terminal and the output terminal for providing a circuit path for current to the output terminal during alternate cycles of the input signal, and a fourth controllable switching arrangement connected between the second input terminal and the output terminal for providing a circuit path for current to the output terminal during other alternate cycles of the input signal.

7. Apparatus as defined in claim 6 wherein the third controllable switching arrangement is identical to and a mirror image of the fourth controllable switching arrangement about the output terminal of the second series rectification circuit.

8. Apparatus as defined in claim 7 wherein the third and fourth controllable switching arrangements each include an optical isolator for conducting current to the subscriber's line.

* * * * *